Patented Oct. 7, 1952

2,613,227

UNITED STATES PATENT OFFICE 2,613,227

CUMENE OXIDATION

George G. Joris, Convent, N. J., assignor to Allied Chemical & Dye Corporation, New York, N. Y., a corporation of New York No Drawing. Application May 23, 1950, Serial No. 163,805

4 Claims. (Cl. 260—610)

This invention relates to liquid phase oxidation of cumene by elemental oxygen, particularly oxygen of air, to produce cumene hydroperoxide as major product.

Oxidations by elemental oxygen of different cumene samples in liquid phase are capable of forming under identical experimental conditions varying proportions of dimethyl phenyl carbinol, acetophenone, acids, degradation products, etc., as well as cumene hydroperoxide. Moreover, samples of commercial cumene give widely discordant results in terms of conversion rates and yields for air oxidation of cumene to cumene hydroperoxide. Additionally, cumene upon liquid phase oxidation with elemental oxygen exhibits an induction period, varying with temperature and source and pretreatment of the cumene, but observable even in the most readily oxidizable cumene samples and even at relatively elevated temperatures, above 100° C. The foregoing facts are indicative of a chain mechanism for oxidation of cumene to cumene hydroperoxide wherein small amounts of foreign materials may exert inhibitor, catalyzer or cumene hydroperoxide decomposition accelerator activity.

An object of this invention is to provide a specific additive which, when present even in catalytic quantities, greatly diminishes the irregularities normally observed in cumene oxidations and moreover shows specific catalytic activity, increasing oxidation rates over those obtainable with no additive and resulting in improved yields of cumene hydroperoxde based on cumene reacted, as against yields in absence of an additive.

In accordance with my invention, I contact cumene during oxidation thereof in liquid phase by elemental oxygen with solid calcium carbonate, suitably in suspension as a powder in the oxidation reaction mixture.

Calcium carbonate is distinguished from related materials, e. g. sodium carbonate and barium carbonate, in its effect on oxidation of cumene by the fact that solid calcium carbonate additive eliminates the induction period normally observed in cumene oxidation.

Small amounts of calcium carbonate are operative in my process. For example, amounts as small as 0.1 gram per 100 cc. of reaction mixture exert beneficial influence on the oxidation reaction. Larger amounts, up to about 5 grams of calcium carbonate powder per 100 cc. of reaction mixture produce still better results and still larger quantities may be used but offer no particular advantage.

The following examples are illustrative of my invention, but it is not intended that the invention be limited thereto. The cumene samples employed in these examples were of high oxidizability to cumene hydroperoxide. Each sample was oxidized by bubbling dried air therethrough in a glass reaction vessel maintained at reaction temperatures as specified below. The additives employed in the examples were in the form of suspensions of solid powdered additive in the reaction mixtures.

*Example 1.*—Three cumene samples were oxidized as outlined above at a temperature of 110° C. in the presence of respectively soda ash powder, Atomite (a commercial calcium carbonate powder) and barium carbonate powder additives, using 2 grams of each powder per 100 cc. of reaction mixture. In the table below, the results are summarized in terms of rate of formation of cumene hydroperoxide at time intervals up to 7.5 hours (rates being in weight percent concentration of cumene hydroperoxide formed in the reaction mixture per hour during each time interval).

It will be seen that except in presence of calcium carbonate catalyst, even at this relatively elevated temperature of 110° C. an induction period is evident, during which cumene oxidation is initially slow. Yields of cumene hydroperoxide based on reacted cumene are substantially the same for all the additives and are in the vicinity of 94% of theory at the final concentration reached. When no additive is employed the yields and rates under the above conditions are much lower than those of the table.

| Interval, hours | $Na_2CO_3$ Rate | $CaCO_3$ Rate | $BaCO_3$ Rate |
|---|---|---|---|
| | Percent | | |
| 0–2 | 1.4 | 2.2 | 1.0 |
| 2–4 | 1.6 | 2.0 | 1.35 |
| 4–6 | 1.9 | 2.0 | 1.8 |
| 6–7.5 | 1.9 | 2.0 | 1.8 |

*Example 2.*—The effect of calcium carbonate in eliminating induction periods at lower operating temperatures is illustrated by the following example. A cumene sample was oxidized as above, except that 1 gram of Atomite calcium carbonate powder per 100 cc. of reaction mixture and a temperature of 90° C. were employed. The results may be summarized as follows:

| Time, hours | Cumene Hydroperoxide Concentration in Reaction Mixture (Wgt. Percent) |
|---|---|
| 4.25 | 3.25 |
| 21 | 15.25 |
| 24.5 | 18 |
| 29.25 | 22.25 |
| 35 | 26 |
| 43 | 31 |

When 2 grams of the calcium carbonate powder per 100 cc. of reaction mixture, instead of 1 gram per 100 cc., were employed in the procedure of this example a faster reaction resulted, in which there was likewise no induction period and which produced a 35.5% cumene hydroperoxide concentration in 41.5 hours. The yields of hydroperoxide based on reacted cumene in these two runs, at the final hydroperoxide concentrations reached, were respectively 93% and 92% as measured iodometrically (a method which usually gives somewhat low results).

The oxidation is practically free of an induction period at 90 °C. when carried out as above but with only 0.5 gram of the calcium carbonate powder per 100 cc. of reaction mixture; but has correspondingly lower rate, going to about 25% hydroperoxide concentration in 44 hours with 94% yield, and thereafter falling off in rate and yield. With smaller amounts of the powder, marked advantage in overall rate and yield as compared to no additive is still obtained, but induction periods appear. Larger amounts of powder than 2 gram per 100 cc., e. g. 5 gram per 100 cc. have been used successfully but without advantage over use of 2 gm. per 100 cc.

Results obtained vary somewhat with the source and preparation method of the calcium carbonate powder, but all calcium carbonate powders tested have given beneficial results of the character above-described.

An advantage of calcium carbonate additive is that oxidation of cumene using this additive is substantially unaffected by presence or absence of water in the reaction mixture; accordingly precautions need not be taken to exclude water during the oxidation, nor need water be present.

Calcium carbonate additive may be used simultaneously with one or more other additives, e. g. soda ash. Rates of oxidation in presence of calcium carbonate alone may tend to drop after about a 25–35% cumene hydroperoxide concentration has been attained. Presence of soda ash overcomes this tendency, as shown by the following example.

*Example 3.*—Four cumene samples were oxidized at 90° C. as in Example 2 above, each in presence of 2 grams of solid powder per 100 cc. of reaction mixture. These powders were respectively calcium carbonate as used above, and 3:1, 2:2 and 1:3 weight ratio mixtures of the calcium carbonate with soda ash powder. All four oxidation reactions showed about the same rates up to about 25% cumene hydroperoxide concentration, but when calcium carbonate powder alone was used, oxidation rates dropped off at about 25% cumene hydroperoxide and dropped sharply at about 35% cumene hydroperoxide concentration, with yields also declining. In the three runs with mixed powders, however, the oxidation rate stayed about constant throughout each of the three runs, all of which reached 41–43% cumene hydroperoxide concentrations after 46–48 hours. The yields of hydroperoxide throughout these runs with mixed powders were very good being at least 92% of theory at the end of each (iodometric method of analysis).

An advantage of calcium carbonate over certain other additives is that in its presence, temperatures above 100° C. can be used for cumene oxidation with corresponding high oxidation rates and with obtainment of good yields. This is illustrated in Example 1 above which shows using a temperature of 110° C. and obtaining a rate of 2% per hour of cumene hydroperoxide formation with yield of about 94% of theory at 15–16% cumene hydroperoxide concentration. With calcium carbonate additive, temperatures as high as 120° C. or even 130° C. can be employed at least briefly; and temperatures as low as 70° C. give appreciable oxidation rates. Preferred cumene oxidation temperatures in presence of calcium carbonate are in the range 80°–110° C. and more especially 90°–110° C. as shown in the above examples.

I claim:

1. The improvement in processes for oxidizing cumene in liquid phase by elemental oxygen to cumene hydroperoxide which comprises contacting said cumene with solid calcium carbonate during said oxidation.

2. Process as defined in claim 1, wherein oxidation is effected at temperatures in the range 90°–110° C. and air is employed as oxidizing agent.

3. Process as defined in claim 2, wherein sodium carbonate powder is present along with calcium carbonate powder.

4. Process as defined in claim 1, wherein at least about 0.1 gram of calcium carbonate powder per 100 cc. of reaction mixture is employed and temperatures during at least part of the oxidation period are above 100° C.

GEORGE G. JORIS.

REFERENCES CITED

The following references are of record in the file of this patent:

UNITED STATES PATENTS

| Number | Name | Date |
|---|---|---|
| 2,430,865 | Farkas et al. | Nov. 18, 1947 |
| 2,447,794 | Brewer | Aug. 24, 1948 |
| 2,484,841 | Lorand | Oct. 18, 1949 |